(12) United States Patent  
Kitoh

(10) Patent No.: US 6,858,348 B2  
(45) Date of Patent: *Feb. 22, 2005

(54) LITHIUM SECONDARY BATTERY WITH LOW INTERNAL RESISTANCE

(75) Inventor: Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 98 days.

This patent is subject to a terminal disclaimer.

(21) Appl. No.: 10/205,082

(22) Filed: Jul. 25, 2002

(65) Prior Publication Data

US 2002/0187395 A1 Dec. 12, 2002

Related U.S. Application Data

(63) Continuation of application No. 09/186,308, filed on Nov. 4, 1998, now Pat. No. 6,455,198.

(30) Foreign Application Priority Data

Nov. 10, 1997 (JP) .............................................. 9-306930  
Sep. 17, 1998 (JP) ............................................ 10-263513

(51) Int. Cl.⁷ ............................................... H01M 4/46
(52) U.S. Cl. .................................... 429/231.1; 429/122
(58) Field of Search .............................. 429/231.1, 122

(56) References Cited

U.S. PATENT DOCUMENTS

| | | |
|---|---|---|
| 4,539,274 A | 9/1985 | Goebel |
| 5,316,877 A | 5/1994 | Thackeray |
| 5,425,932 A | 6/1995 | Tarascon |
| 5,478,672 A * | 12/1995 | Mitate ......................... 429/224 |
| 5,591,546 A * | 1/1997 | Nagaura ..................... 429/224 |
| 5,601,952 A * | 2/1997 | Dasgupta et al. ........... 429/224 |
| 5,700,597 A | 12/1997 | Zhong |
| 6,455,198 B1 * | 9/2002 | Kitoh ....................... 429/231.1 |

FOREIGN PATENT DOCUMENTS

| | | |
|---|---|---|
| EP | 0 973 221 A1 | 1/2000 |
| EP | 0 987 779 A1 | 3/2000 |
| EP | 0 993 058 A1 | 4/2000 |
| WO | WO 96/40590 | 12/1996 |

OTHER PUBLICATIONS

Tarascon, J.M., et al., "The $Li_{1+x}Mn_2O/C$ Rocking–Chair System: A Review," Electrochimica Acta, Elsevier Science Publishers, Barking, GB, vol. 38, No. 9, Jun. 1, 1993, pp. 1221–1231.

U.S. Appl. No. 09/389,767, filed Sep. 2, 1999.

Horie, Hideaki et al., "Development of High–Power Lithium–Ion Battery Sysem for HEVs", Automobile Technology Association, Collection of Preprints for Academic Lecture 971 (1997), pp. 53–56.

Lithium Ion Batteries, Fundamentals and Performance, Editied by M. Wakihara, O. Yamamoto (eds.), Kodansha, Wiley–VCH, ISBN4–06–208631–X C3043, pp. 26, 27, 98, 99, 127 and 181.

* cited by examiner

*Primary Examiner*—Mark Ruthkosky  
(74) *Attorney, Agent, or Firm*—Burr & Brown

(57) ABSTRACT

A lithium secondary battery is provided in which even if the depth of discharge becomes deep, lowering of an power is small, and charging and discharging characteristics are excellent, and which is suitably used particularly as a battery for driving a motor of an electric vehicle or the like. In the lithium secondary battery, an internal electrode body formed by winding a positive electrode and a negative electrode through a separator made of porous polymer is contained in a battery case, and an organic electrolyte is used. An power at a depth of discharge of 80% is not smaller than 60% of an power at a depth of discharge of 0%.

16 Claims, 3 Drawing Sheets

LITHIUM SECONDARY BATTERY WITH LOW INTERNAL RESISTANCE

CROSS REFERENCE TO RELATED APPLICATION

This application is a continuation application of U.S. application Ser. No. 09/186,308 filed Nov. 4, 1998, now allowed, the entirety of which is incorporated herein by reference. Now U.S. Pat. No. 6,455,198.

BACKGROUND OF THE INVENTION AND RELATED ART STATEMENT

The present invention relates to a lithium secondary battery in which lowering of its power is small even in the case where a depth of discharge becomes deep, its internal resistance is low, and its charging and discharging properties are excellent, and particularly which is suitably used as a battery for driving a motor of an electric vehicle or the like.

In recent years, to cope with a raise in an environmental protection campaign, in the automobile industry, instead of a vehicle using fossil fuels, such as a gasoline vehicle, for the purpose of promoting the introduction of an electric vehicle (EV) or a hybrid electric vehicle (HEV), a battery for driving a motor, which holds the key to making the EV fit for practical use, has been diligently developed.

As a battery for the EV and HEV, in recent years, attention has been paid to a lithium secondary battery having a large energy density, which can lengthen the mileage on one charge as compared with a case where a conventional lead-acid storage battery or a nickel-hydrogen battery is used.

In the lithium secondary battery, a lithium compound is used for a positive active material, and various carbon materials are used for a negative active material. At charging, lithium ions in the positive active material move into the negative active material, and at discharging, the lithium ions captured by the negative active material move to the positive active material, so that charging and discharging are carried out.

The structure of an internal electrode body as a place of a battery reaction in such a lithium secondary battery is roughly divided into a winding type and a lamination type. The internal electrode body of the winding type is fabricated in such a manner that, as shown in FIG. 4, a positive electrode 2 and a negative electrode 3 are wound through a separator 4, and a tab 5 as a current collecting lead is attached to each of the positive electrode 2 and the negative electrode 3. The cylindrical internal electrode body 1 as well as an electrolyte is contained and sealed in a cylindrical container so that an electric cell is fabricated. The structure of an electric cell using such a winding type internal electrode body 1 is suitable for fabricating a compact battery while using a large area electrode (positive electrode and/or negative electrode). In this winding type internal electrode body 1, at least one is sufficient for the number of tabs 5 from each of the positive and negative electrode plates 2 and 3, and even in the case where current collecting resistance from the respective positive and negative electrode plates 2 and 3 is desired to be made small, it is sufficient if the number of tabs 5 is increased, so that the winding type has features that the structure of the inside of the battery does not become complicated, and assembly of the battery is easy.

On the other hand, as shown in FIG. 5, a lamination type internal electrode body 7 is formed by alternately laminating a positive electrode 8 and a negative electrode 9 through a separator 10, and even in the case where an area to one of the positive electrodes 8 and the like is not large, the electrode area of the entire of the battery can be made large by laminating a plurality of electrodes. The shape of the fabricated internal electrode body 7 can be freely designed into, for example, a rectangular parallelepiped type, a disk type, or a cylinder type, by means of the shape of the positive and negative electrodes 8 and 9 and the number of laminated electrodes, so that the lamination type is suitable for the use of the case where the shape of a battery is restricted. However, since a tab 6 is necessary for each of the positive and negative electrode 8 and 9, in addition to other reasons, the structure of the inside of the battery becomes complicated, so that the winding type is superior from the viewpoint of assembly working of the battery.

Even if any battery structure is adopted, since the terminal voltage of the lithium secondary battery is about 4 V, an aqueous solution type electrolyte can not be used, and an organic type electrolyte having lithium ion conductivity lower than that of the aqueous solution type electrolyte must be used. Thus, the internal resistance of a battery is apt to become large. However, in a battery for an EV or an HEV, since the internal resistance and power characteristics of the battery mainly determine the acceleration performance, climbing performance, and the like, it becomes important to make the internal resistance of the battery small and to stabilize the power characteristics.

With respect to the lithium secondary battery as a battery for an EV, for example, "Automobile Technology Association, Collection of Preprints for Academic Lecture 971 (1997)", pp. 53–56 discloses characteristics of a lithium secondary battery in which $LiCoO_2$ is used for a positive active material and hard carbon is used for a negative active material.

In the publication, as the discharge characteristics of the battery, a discharge specific power at a time when 10 seconds has elapsed in each depth of discharge (hereinafter referred to as DOD) is disclosed. The publication discloses that in the case where 4 v is made a full charge, when the DOD is 0%, the specific power is 1540 W/kg, and when the DOD is 80%, the specific power is 500 W/kg, which indicates that the specific power when the DOD is 80% is only about 32% of that when the DOD is 0%. And also, in the case where 4.2 V is made a full charge, when the DOD is 0%, the specific power is 1740 W/kg, and when the DOD is 80%, the specific power is 620 W/kg, which indicates that the specific power when the DOD is 80% is about 36% of that when the DOD is 0%.

Like this, in the conventional lithium secondary battery, there is a problem that when the DOD becomes deep, the power is remarkably decreased as compared with the case where the DOD is shallow. As one of the causes, it is conceivable that the diffusion of lithium ions in the positive active material is limited to the lithium plane direction in the crystal structure of $LiCoO_2$ used as the positive active material, and the lithium ions can diffuse only two-dimensionally, and as a result, the internal resistance becomes large.

That is, it is conceivable that as the DOD becomes deep, sites in $LiCoO_2$ for taking in the lithium ions are decreased, and the diffusion direction of the lithium ions is limited, so that the speed of taking in the lithium ions into $LiCoO_2$ becomes slow, the movement of the lithium ions from the negative electrode to the positive electrode is blocked, the internal resistance value becomes high, and decrease of power is caused. Since the diffusion of the lithium ion naturally occurs from the surface of the $LiCoO_2$ particle, it is conceivable that this phenomenon is remarkable particularly on the surface of the particle. This is also the case with nickel acid lithium ($LiNiO_2$) used for the positive active material similar to $LiCoO_2$.

Like this, in the case where the decrease in power when the DOD is deep is large, by residual capacity of the battery, a difference occurs in acceleration performance where a particularly large power is required. In the case where the acceleration performance is lowered in this way, there is such a fear that a rear-end collision from the back takes place or running of other vehicles is blocked to cause traffic congestion. Thus, in the battery for an EV or HEV, even in the case where the DOD is deep, that is, even in the case where the residual capacity of the battery is small, it is necessary for the battery to exert the designated acceleration performance, and it is necessary to provide the battery in which the increase of internal resistance and the decrease of power, which are caused from change of the depth of the DOD, are small.

On the other hand, although it is also possible to increase the entire capacity of the battery to a degree that an power necessary for obtaining sufficient acceleration performance is obtained even in the case where the DOD is deep, this is disadvantageous in that the space utility of a vehicle becomes deteriorated since the volume of the battery becomes large, the total weight of the vehicle becomes high, coefficient of utilization of the battery becomes inferior, and the cost of the batteries increases.

With respect to $LiCoO_2$ used for the positive active material, the production of Co as a constituent material is not necessarily large in amount even in the world, and is a relatively expensive material, so that the material has a problem in the use as general-purpose parts in view of cost. Moreover, since the countries of origin are limited, the material has also a problem in securing of the raw material, stable supply of products to a market, and the like.

SUMMARY OF THE INVENTION

In view of the above described problems of the conventional battery, the present inventors fabricated a large capacity lithium secondary battery having 5 Ah or more, which is considered to be necessary as a battery for an EV or an HEV, by mainly using lithium manganate as a positive active material and a graphite-based carbon material as a negative active material, and clarified the relation between a DOD and an internal resistance, and between the DOD and an power, so that the inventors found that a battery in which an internal resistance at a DOD of 80% is not larger than 120% of an internal resistance at a DOD of 0%, and an power at a DOD of 80% is not less than 60% of an power at a DOD of 0%, is suitable as a battery for an EV and an HEV.

That is, according to the present invention, there is provided a lithium secondary battery comprising a battery case and an internal electrode body which is contained in the battery case and in which a positive electrode and a negative electrode are wound or laminated through a separator made of porous polymer so that the positive electrode and the negative electrode are not brought into direct contact with each other, wherein an power at a depth of discharge of 80% is not less than 60% of an power at a depth of discharge of 0%.

Moreover, according to the present invention, there is provided a lithium secondary battery comprising a battery case and an internal electrode body which is contained in the battery case and in which a positive electrode and a negative electrode are wound or laminated through a separator made of porous polymer so that the positive electrode and the negative electrode are not brought into direct contact with each other, wherein an internal resistance at a depth of discharge of 80% is not higher than 120% of an internal resistance at a depth of discharge of 0%.

Such a lithium secondary battery is suitably used for an electric vehicle (EV) or a hybrid electric vehicle (HEV), and the battery capacity of an electric cell is preferably set to 5 Ah or more. In the lithium secondary battery of the present invention, it is preferable to use graphite or highly graphitized carbon material as a negative active material, while lithium-manganese oxide is preferably used as a positive active material and it is preferable that a ratio of Li/Mn is larger than 0.5.

Moreover, according to the present invention, there is provided the lithium secondary battery having a small DOD dependency with respect to an internal resistance and power of the battery, the battery comprising a battery case and an internal electrode body which is contained in the battery case and in which a positive electrode and a negative electrode are wound or laminated through a separator made of porous polymer so that the positive electrode and the negative electrode are not brought into direct contact with each other, wherein lithium manganate having a spinel structure is used as a positive active material and the battery is used for an electric vehicle or a hybrid electric vehicle.

Here, it is preferable to use lithium-manganese oxide having the spinel structure and having a ratio of Li/Mn of more than 0.5.

As described above, since the lithium secondary battery of the present invention has the features that the DOD dependency of the power is small and the internal resistance is small, the battery can be suitably used particularly as a battery for an EV.

DETAILED DESCRIPTION OF PREFERRED EMBODIMENT

Preferred embodiments of the present invention will be described below. However, the present invention is not limited to these embodiments.

Figure 4:
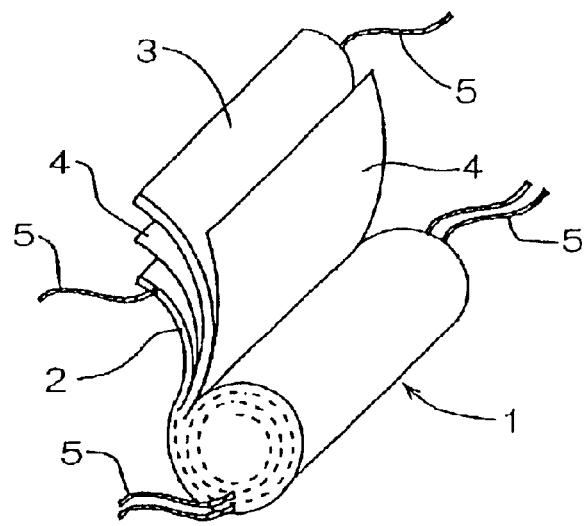
FIG. 4 is a perspective view showing the structure of a winding type internal electrode body.
Figure 5:
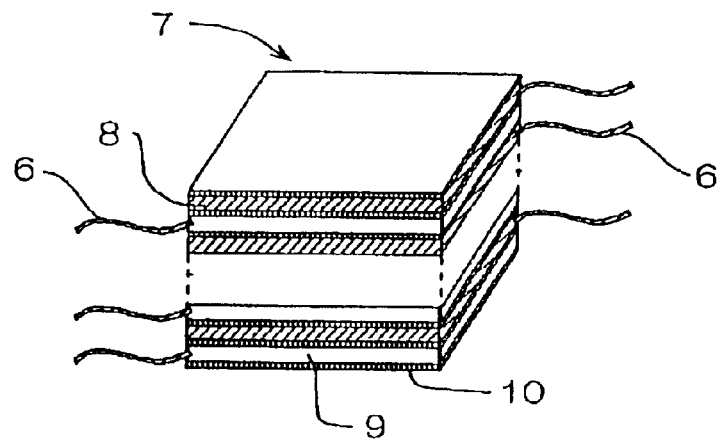
FIG. 5 is a perspective view showing the structure of a lamination type internal electrode body.

An internal electrode body of a lithium secondary battery of the present invention is structured such that a negative electrode and a positive electrode are wound or laminated through a separator made of porous polymer so that the negative electrode and the positive electrode are not brought into direct contact with each other, and concretely, the structure as shown in FIG. 4 or 5, that is, an internal electrode body 1 or 7 can be cited.

As the positive electrode, it is preferable to use an aluminum foil, as a current collecting body, coated with a positive material made by mixing carbon powder to improve conductivity into a positive active material. In the present invention, lithium-manganese oxide ($LiMn_2O_4$) is preferably used as the positive active material and particularly, it is preferable to use lithium-manganese oxide ($LiMn_2O_4$ spinel) which belongs to a cubic system and has a spinel type crystal structure. By this, maintaining stability of power against the DOD and lowering of internal resistance can be achieved. However, as set forth in the examples described later, even in the case where $LiCoO_2$ is used, if the material is combined with a specific negative active material, it is possible to fabricate a battery in which although the DOD dependency of internal resistance and power is larger than a case where $LiMn_2O_4$ is used, the dependency is smaller than that of the conventional battery.

$LiMn_2O_4$ used in the lithium secondary battery of the present invention is not limited to such a material having stoichiometric composition, but as long as the crystal structure can be maintained, it does not matter if a positive ion is lacking or excessively exists, while an oxygen ion is lacking or excessively exists. Moreover, part of Mn may be substituted by other ion, for example, at least one kind of positive ion selected from substitution elements M, such as Li, Fe, Mn, Ni, Mg, Zn, B, Al, Co, Cr, Si, Ti, Sn, P, V, Sb, Nb, Ta, Mo, and W.

In the present invention, among the forgoing materials of $LiMn_2O_4$, if a material having a ratio of Li/Mn of more than 0.5 is particularly used, as compared with the case where a material of stoichiometric composition is used, the internal resistance is further lowered and a high power battery can be obtained. Thus, such a material is preferable. As an example in which the ratio of Li/Mn is more than 0.5, $Li(Li_xMn_{2-x})O_4$ in which part of Mn is substituted by Li, $LiM_xMn_{2-x}O_4$ in which part of Mn is substituted by the above substitution element M except for Li, and the like may be cited. Since the ratio of Li/Mn of the former is given by (1+X)/(2−X), and the ratio of Li/Mn of the latter is given by 1/(2−X), when X>0, the ratio of Li/Mn of both necessarily becomes larger than 0.5.

Even in the case where $LiMn_2O_4$ is used, as the depth of discharge becomes deep, coordinate sites of lithium ions decrease, and diffusion of the lithium ions becomes slow, so that it is difficult to completely eliminate the lowering of the power. However, $LiMn_2O_4$ is more advantageous than $LiCoO_2$ or $LiNiO_2$, in that the diffusion plane of lithium ions is not limited to the lithium plane in the crystal structure unlike the foregoing $LiCoO_2$ or $LiNiO_2$, and the diffusion of lithium ions occurs three-dimensionally. That is, in the case where the number of vacant coordinate sites of lithium ions in the positive active material is the same in these active materials, it is surmised that in the case where $LiMn_2O_4$ having many diffusion paths of the lithium ions is used, coordination of the lithium ions to the vacant coordinate sites is smoothly progressed.

That the diffusion path is three-dimensional indicates that the diffusion path is secured even if the positive electrode is formed by coating the metal foil with the positive active material powder. That is, in the case where the powder having only two-dimensional lithium ion diffusion paths, such as $LiCoO_2$, is coated on the metal foil, the particle in which an entrance of the foregoing diffusion plane is clogged by contact with other particles or the metal foil does not substantially function as an electrode active material even if the surface which is not an entrance of the diffusion plane of the lithium ion forms an interface against an electrolyte. However, in $LiMn_2O_4$ having three-dimensional diffusion paths, as long as the whole surface of the powder is not clogged, ion diffusion paths at the time of formation of the electrode can be secured more easily than $LiCoO_2$. It is conceivable that in this way, in the case where $LiMn_2O_4$ is used, lowering of an specific power at a deep depth of discharge can be suppressed as compared with the case of using $LiCoO_2$.

In the case where diffusion paths of lithium ions in $LiMn_2O_4$ like this are considered, $LiMn_2O_4$ having an excellent symmetry in crystal structure, that is, $LiMn_2O_4$ spinel is preferable since diffusion of lithium ions is carried out most easily. Moreover, for the purpose of realizing such a state that the lithium ions are uniformly diffused and coordinated to the coordinate sites in the positive active material, particles having a narrow particle distribution range and uniform shape are preferable as the positive active material powder.

Here, according to materials, there are often cases where formation of uniformly shaped particles is difficult from crystal chemical properties, for example, anisotropy of crystal structure. However, since $LiMn_2O_4$ spinel has a crystal structure with excellent symmetry as a cubic system, it is relatively easy to obtain particles with uniform diameter by various synthesizing methods and powder processing methods.

However, whatever electrode active material powder, having any shape and any particle diameter, is used, it is necessary to avoid such a state that in the case where such powder is coated on a metal foil and is fixed, an area per unit weight of an interface between electrode active material powder functioning as an electrode and the electrolyte becomes small, or although the area of the interface between the electrode active material powder and the electrolyte can be made large, the conductivity is lowered so that the internal resistance of the electrode becomes large. That is, it is required that the characteristics of the electrode active material powder can sufficiently function as an electrode.

As described above, that the diffusion path of the lithium ion to the positive active material powder is secured means that excellent discharge characteristics can be obtained, and reversely, it means that the diffusion of the lithium ion from the positive active material is also excellently carried out, that is, the charging characteristics are also excellent.

As carbon powder added to the thus selected positive active material, acetylene black, graphite powder, and the like can be exemplified. As the aluminum foil constituting the positive electrode, in order to prevent the lowering of battery performance due to corrosion by an electrochemical reaction of a battery, it is preferable to use a high purity material.

Next, as the negative electrode, although a copper foil coated with an amorphous carbon material, such as soft carbon or hard carbon as a negative active material, or carbon powder, such as natural or artificial graphite, can be used. However, in the present invention, highly graphitized carbon materials, such as graphite or artificial graphite in which the diffusion of lithium ions in the crystal is easy, the specific gravity is large, and the rate of lithium ions contributing to charging and discharging which can be maintained per unit weight is large, is particularly preferable as a negative active material.

Also with respect to the copper foil used as the negative electrode, like the aluminum foil used as the positive electrode, it is preferable to use a highly pure material in order to withstand corrosion due to an electrochemical reaction.

As the separator, a three-layer structure in which a lithium ion permeable polyethylene film (PE film) having micropores is sandwiched between porous lithium ion permeable polypropylene films (PP films) is preferably used. This separator serves also as a safety mechanism in which when the temperature of the internal electrode body is raised, the PE film is softened at about 130° C. so that the micropores are collapsed to suppress the movement of the lithium ions, that is, the battery reaction. Since the PE film is sandwiched between the PP films having higher softening temperature, even in the case where the PE film is softened, the PP films maintain the shape to prevent contact and short circuit between the positive electrode and the negative electrode, so that it becomes possible to certainly suppress the battery reaction and to secure safety.

As the electrolyte, a solution obtained by dissolving $LiPF_6$ as an electrolyte into a mixed solution of ethylene carbonate (EC) and diethyl carbonate (DEC) is preferably used. The battery structure is not particularly limited, and it is possible to adopt the structure in which the structure of a small lithium secondary battery is similarly enlarged. The present inventors et al. proposed a battery structure in which various pressure releasing mechanisms are disposed at suitable places in Japanese Patent Application No. 9-202963, and such a battery structure can also be preferably used.

In the lithium secondary battery fabricated by using various materials which are preferable in the present invention, such excellent power characteristics are shown that the power at a DOD of 80% is not less than 60% of the power at a DOD of 0%, and such low internal resistance increasing characteristics are shown that the internal resistance at a DOD of 80% is not higher than 120% of the internal resistance at a DOD of 0%. By this, the lithium secondary battery of the present invention is suitably used as a battery for an EV and an HEV.

It is conceivable that the greatest cause of such battery characteristics is that although the coordinate sites of lithium ions in the $LiMn_2O_4$ powder of the positive active material become few as the DOD becomes deep, the diffusion of the lithium ions to the vacant coordinate sites is in the state which is not greatly different from the state of the shallow DOD in which many vacant sites exist, that is, the coordinate sites are uniformly distributed in the positive electrode, the diffusion path of the lithium ions is secured, and uniform diffusion is carried out, and further, such battery characteristics show that diffusion of the lithium ions from the negative electrode is also carried out excellently so that the foregoing diffusion of the lithium ions is carried out.

Next, although examples of the lithium secondary batteries of the present invention will be described, the present invention is not limited to these examples.

EXAMPLE 1

$LiMn_2O_4$ spinel (ratio of Li/Mn=0.5) having stoichiometric composition was used as a positive active material, and a positive electrode with an electrode surface shape of 3400 mm in winding direction length×200 mm in width was fabricated by coating an aluminum foil with a mixture obtained by adding and mixing carbon powder (acetylene black) to increase conductivity into the positive active material. On the other hand, a negative electrode with 3600 mm in winding direction length×200 mm in width was fabricated by coating a copper foil with highly graphitized carbon material (fiber powder). The thus fabricated positive electrode and negative electrode were wound while they were insulated from each other by using a microporous separator made of polypropylene, so that an internal electrode body was fabricated.

Figure 1:
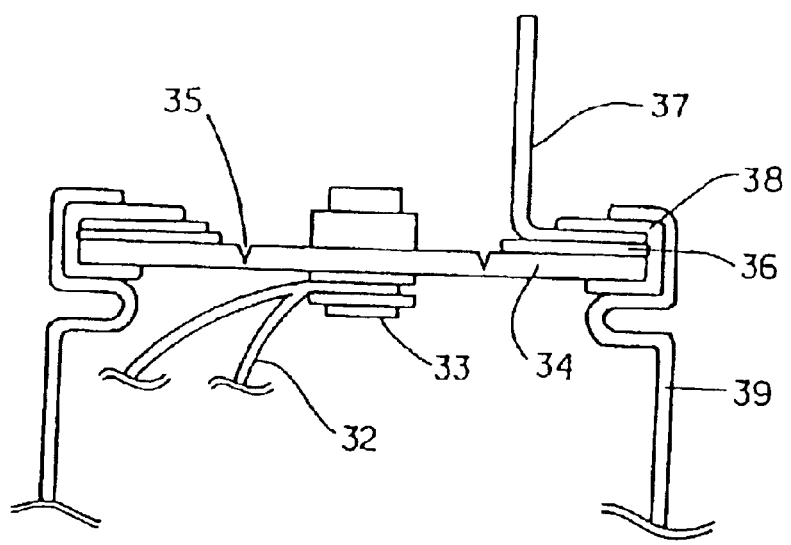
FIG. 1 is a sectional view showing the terminal structure of a lithium secondary battery fabricated in an embodiment.

Next, the fabricated internal electrode body was inserted in a cylindrical battery case, and after one end was sealed by a sealing structure shown in FIG. 1, an electrolyte obtained by dissolving a $LiPF_6$ electrolyte in a mixing solution of ethylene carbonate (EC) and diethyl carbonate (DEC) is filled, and the other end is also sealed by the sealing structure shown in FIG. 1, so that the battery is sealed.

In FIG. 1, a current collecting tab 32 connected to either one electrode (not shown) of the positive electrode and the negative electrode is connected to a metal rivet 33 attached to a disk 34 for sealing a battery case 39. The disk 34 is provided with a pressure releasing valve 35 which is ruptured at a designated pressure, and is caulked to the battery case 39 through an ethylene propylene rubber 38 so that an outer terminal 37 is electrically connected to the disk 34 through a metal ring 36, and the disk 34, the metal ring 36, and the outer terminal 37 are electrically insulated from the battery case. In this way, a cylindrical both ends terminal type battery in which an outer terminal of either one of the positive and negative electrodes is disposed at one end of the battery case 39 is fabricated. Incidentally, as the battery case 39, an aluminum cylinder with an outer diameter of 50 mm, a thickness of 1 mm, and a length of 245 mm was used, and also as the disk 34, an aluminum disk for positive electrode and a copper disk for negative electrode were used.

Current collection from each of the positive and negative electrodes was performed by using tabs welded to the current collecting tabs provided on the positive and negative electrodes. The current collecting tabs were provided so that they were divided to each end portion of the internal electrode body to make the above battery structure. The tabs were set such that in the state where the respective electrodes were developed in a flat plane, the distance between adjacent current collecting tabs was about 100 mm so that it did not become longer than the circumferential length of the battery, and after winding, the respective current collecting tabs were positioned on the same radius of an end circle of the wound body.

EXAMPLE 2

In example 2, a battery in which $LiMn_2O_4$ spinel with a ratio of Li/Mn of 0.55 was used as a positive active material, other materials were the same as the example 1, and the structure was the same as the example 1, was fabricated.

EXAMPLE 3

In example 3, a battery in which $LiCoO_2$ powder was used as a positive active material, other materials were the same as the example 1, and the structure was the same as the example 1, was fabricated.

COMPARATIVE EXAMPLE

Next, as a comparative example, a battery in which the structure was the same as the examples 1 to 3, $LiCoO_2$ which was the same as the example 3 was used as a positive active material, and hard carbon was used as a negative active material, was fabricated.

(Charging Condition and Adjustment of DOD)

All the fabricated batteries were fully charged at 10 A constant current –4.1 V constant voltage. Battery capacity at full charging was 25 Ah in the example 1, 22 Ah in the example 2, and 30 Ah in the example 3 and the comparative example. The full charging state was considered as the DOD is 0%. From this state, when constant current discharge for one hour at current equivalent to discharge rate of 0.2 C (5 hour rate) (25 A×0.2=5 A in the example 1, 22 A×0.2=4.4 A in the example 2, and 30 A×0.2=6 A in the example 3 and the comparative example) was performed, the DOD was made 20%. Similarly, the states of the DOD of 40%, 60%, and 80% were prepared.

(Measurement of Internal Resistance and Power of a Battery)

The measurement of the internal resistance at each DOD was carried out such that from an open circuit state, electric current of a discharge rate of 0.2 C was applied, the difference between the open circuit voltage and the voltage immediately after application of current was divided by current value to obtain the internal resistance, and normalization was made such that the internal resistance at a DOD of 0% was made 100%.

The measurement of power at each DOD was carried out such that constant current discharge for 10 seconds was carried out at a current value not lower than 2.5 V after 10 seconds from the start of discharge, and the power was obtained by a product of voltage and current at the time when ten seconds elapsed, and normalization was made such that the power at a DOD of 0% was made 100%.

(Test Result)

Figure 2:
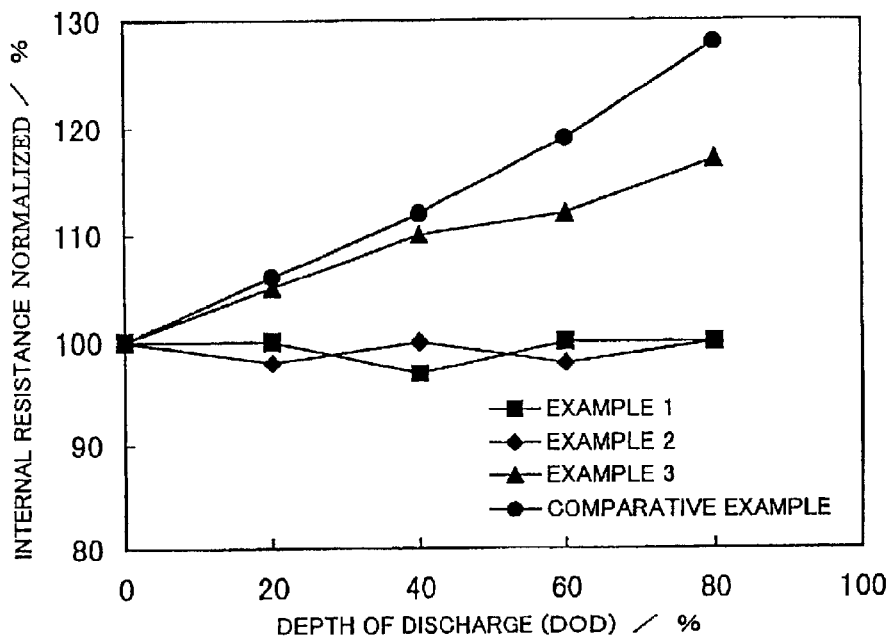
FIG. 2 is a graph showing the relation between the depth of discharge and the rate of change of internal resistance in examples of the present invention and a comparative example.

FIG. 2 shows the relation between the internal resistance normalized and the DOD. In the comparative example, as the DOD became deep, the internal resistance value became gradually large, and the internal resistance at a DOD of 80% was increased up to 128% of that at a DOD of 0%. On the contrary, in the examples 1 and 2, increase of the inner resistance was hardly seen, and change was not substantially capable of being seen until the DOD reached 80%. In the example 3, the internal resistance at a DOD of 80% was increased up to about 116% of that at a DOD of 0%. Thus, from the comparison between the examples 1, 2 and the example 3, it is conceivable that the difference of diffusion resistance due to the difference of diffusion paths of the lithium ions in the positive active material appears in the increase of the internal resistance value. Moreover, from the comparison between the example 3 and the comparative example, it is surmised that the difference in reactivity between the negative active material and the lithium ion also causes the increase of the internal resistance. However, it is surmised that the effect is smaller than that by the positive active material.

Although the internal resistance at a DOD of 0% was 4.0 mΩ in the example 1, the internal resistance in the example 2 was 3.1 mΩ which was smaller than that of the example 1 by about 20%. From this, it has become clear that even if $LiMn_2O_4$ spinel is used, in the case where the ratio of Li/Mn is larger than 0.5, the effect of lowering of the internal resistance itself can also be obtained.

Figure 3:
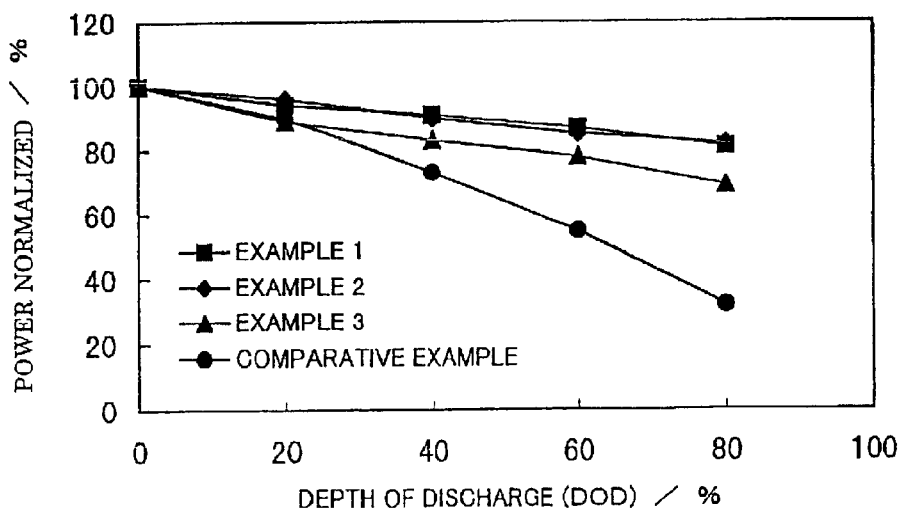
FIG. 3 is a graph showing the relation between the depth of discharge and the rate of change of power in examples of the present invention and a comparative example.

Next, FIG. 3 shows the relation between the the power normalized and the DOD. In the examples 1 and 2, even if the DOD became deep, lowering of discharge specific power was small, and even when the DOD was 80%, the discharge specific power of about 82% of that at a DOD of 0% was obtained. In the example 3, the power at a DOD of 80% was lowered merely to about 69% of that at a DOD of 0%. On the contrary, in the comparative example, almost the same contents as disclosed in the foregoing cited reference were realized, and the power at a DOD of 80% reached merely about 36% of that at a DOD of 0%.

Although the specific power at a DOD of 0% was 1000 W/kg in the example 1, the specific power in the example 2 was 1200 W/kg which was larger than the example 1 by about 20%. It is conceivable that this is caused by that the internal resistance itself of the battery is lowered by using $LiMn_2O_4$ spinel with a ratio of Li/Mn of more than 0.5.

From the above results, although the increase of the internal resistance of the battery in correspondence with deepening of the DOD is not the only cause of the lowering of the power of the battery, the tendency that the lowering of the power is suppressed when the increase of the internal resistance of the battery is small, remarkably appears. Thus, using $LiMn_2O_4$ as the positive active material is suitable for the object that the DOD dependency of the internal resistance and the power is made small, and stable power is obtained in a wide DOD range. As is apparent from the comparison of the DOD dependency with respect to the internal resistance and the power between the example 3 and the comparative example in which only the negative active materials are different, it is preferable to use the highly graphitized carbon material as the negative active material.

As described above, the lithium secondary battery of the present invention has excellent effects that even in the case where the depth of discharge becomes deep, the increase rate of the internal resistance value is small, and the lowering of power is small, so that necessary large power is always obtained independently of a use state, and charging and discharging characteristics are excellent. Moreover, when $LiMn_2O_4$ having the ratio of Li/Mn of more than 0.5 is used as the positive active material, remarkable effects are obtained such that the internal resistance itself is decreased, and the high power of the battery is achieved.

What is claimed is:

1. A lithium secondary battery, comprising:
   a battery case;
   an internal electrode body contained in the battery case and including a positive electrode, a negative electrode made of graphite or artificial graphite, a separator made of porous polymer, a plurality of current collecting portions welded directly to said positive electrode, and a plurality of current collecting portions welded directly to said negative electrode, a positive electrode material for the positive electrode consisting essentially of lithium-manganese oxide having a spinel structure with a ratio of Li/Mn of more than 0.5, the positive electrode and the negative electrode being wound or laminated through the separator; and
   an organic electrolyte,
   said battery having an internal resistance at a depth of discharge of 0% of not more than 3.1 mΩ.

2. A lithium secondary battery as recited in claim 1, wherein said battery has a power at a depth of discharge of 0% of at least 1,200 W/kg.

3. A lithium secondary battery as recited in claim 1, wherein said negative electrode has a length of at least 3,600 mm.

4. A lithium secondary battery as recited in claim 1, wherein said battery has a battery capacity of at least 5 Ah.

5. A lithium secondary battery, comprising:
   a battery case;
   an internal electrode body contained in the battery case and including a positive electrode, a negative electrode made of graphite or artificial graphite, a separator made of porous polymer, a plurality of current collecting portions welded directly to said positive electrode, and a plurality of current collecting portions welded directly to said negative electrode, a positive electrode material for the positive electrode consisting essentially of (a) lithium-manganese oxide having a spinel structure with a ratio of Li/Mn of more than 0.5 and (b) acetylene black or graphite powder, the positive electrode and the negative electrode being wound or laminated through the separator; and an organic electrolyte, said battery having an internal resistance at a depth of discharge of 0% of not more than 3.1 mΩ.

6. A lithium secondary battery as recited in claim 5, wherein said battery has a power at a depth of discharge of 0% of at least 1,200 W/kg.

7. A lithium secondary battery as recited in claim 5, wherein said negative electrode has a length of at least 3,600 mm.

8. A lithium secondary battery as recited in claim 5, wherein said battery has a battery capacity of at least 5 Ah.

9. A lithium secondary battery, comprising;

a battery case;

an internal electrode body contained in the battery case and including a positive electrode, a negative electrode, a separator made of porous polymer, a plurality of current collecting portions welded directly to said positive electrode, and a plurality of current collecting portions welded directly to said negative electrode, a positive electrode material for the positive electrode consisting essentially of lithium-manganese oxide having a spinel structure with a ratio of Li/Mn of more than 0.5, the positive electrode and the negative electrode being wound or laminated through the separator; and an organic electrolyte, said battery having an internal resistance at a depth of discharge of 0% of not more than 3.1 mΩ.

10. A lithium secondary battery as recited in claim 9, wherein said battery has a power at a depth of discharge of 0% of at least 1,200 W/kg.

11. A lithium secondary battery as recited in claim 9, wherein said negative electrode has a length of at least 3,600 mm.

12. A lithium secondary battery as recited in claim 9, wherein said battery has a battery capacity of at least 5 Ah.

13. A lithium secondary battery, comprising:

a battery case;

an internal electrode body contained in the battery case and including a positive electrode, a negative electrode made of graphite or artificial graphite, a separator made of porous polymer, a plurality of current collecting portions welded directly to said positive electrode, and a plurality of current collecting portions welded directly to said negative electrode, the positive electrode and the negative electrode being wound or laminated through the separator; and an organic electrolyte, said battery having internal resistance at a depth of discharge of 0% of not more than 3.1 mΩ.

14. A lithium secondary battery as recited in claim 13, wherein said battery has a power at a depth of discharge of 0% of at least 1,200 W/kg.

15. A lithium secondary battery as recited in claim 13, wherein said negative electrode has a length of at least 3,600 mm.

16. A lithium secondary battery as recited in claim 13, wherein said battery has a battery capacity of at least 5 Ah.

* * * * *

UNITED STATES PATENT AND TRADEMARK OFFICE
CERTIFICATE OF CORRECTION

PATENT NO. : 6,858,348 B2
DATED : February 22, 2005
INVENTOR(S) : Kenshin Kitoh

It is certified that error appears in the above-identified patent and that said Letters Patent is hereby corrected as shown below:

<u>Column 12,</u>
Line 18, please add -- an -- after "having"

Signed and Sealed this

Twenty-fourth Day of May, 2005

JON W. DUDAS
*Director of the United States Patent and Trademark Office*